(12) United States Patent
Scherden

(10) Patent No.: US 8,061,952 B1
(45) Date of Patent: Nov. 22, 2011

(54) WHEEL AND TIRE DOLLY APPARATUS

(76) Inventor: William J. Scherden, Altoona, PA (US)

(*) Notice: Subject to any disclaimer, the term of this patent is extended or adjusted under 35 U.S.C. 154(b) by 825 days.

(21) Appl. No.: 12/142,156

(22) Filed: Jun. 19, 2008

(51) Int. Cl.
*B65G 7/00* (2006.01)

(52) U.S. Cl. ................................ 414/427; 280/79.4

(58) Field of Classification Search .............. 414/426, 414/427, 458; 280/79.4; 187/226, 231; 254/2 B, 254/2 C, 8 R
See application file for complete search history.

(56) References Cited

U.S. PATENT DOCUMENTS

| | | | | |
|---|---|---|---|---|
| 698,896 | A * | 4/1902 | Beierstorf | 187/231 |
| 800,235 | A * | 9/1905 | Nelson | 254/2 B |
| 1,305,322 | A * | 6/1919 | Towler | 29/258 |
| 1,535,762 | A * | 4/1925 | Brejska | 414/427 |
| 1,569,589 | A * | 1/1926 | Stocker | 254/2 B |
| 1,576,836 | A * | 3/1926 | McCarthy | 254/2 B |
| 1,731,204 | A * | 10/1929 | Recchia | 414/427 |
| 1,964,119 | A * | 6/1934 | Hendry | 414/427 |
| 2,039,896 | A * | 5/1936 | Green | 254/2 B |
| 2,644,597 | A * | 7/1953 | Lewis | 414/427 |
| 3,830,387 | A * | 8/1974 | Virnig | 414/427 |
| 4,482,130 | A * | 11/1984 | Paredes | 254/8 R |
| 4,571,142 | A | 2/1986 | Niewald et al. | |
| 5,007,789 | A | 4/1991 | Painter | |
| 5,230,598 | A * | 7/1993 | Steves et al. | 414/427 |
| D350,888 | S | 9/1994 | Perry | |
| 5,348,438 | A | 9/1994 | Roberts | |
| 5,378,004 | A * | 1/1995 | Gunlock et al. | 280/47.2 |
| 5,984,270 | A * | 11/1999 | Hussaini et al. | 254/8 B |
| 6,089,815 | A * | 7/2000 | Mustread | 414/426 |
| 6,106,214 | A | 8/2000 | Saffelle et al. | |
| 6,382,644 | B1 * | 5/2002 | Rawlings | 280/79.4 |
| 6,773,222 | B1 | 8/2004 | Gilchrist | |
| 7,503,577 | B2 * | 3/2009 | McEvoy | 280/493 |
| 7,823,861 | B2 * | 11/2010 | Krug | 254/4 B |
| 2005/0254923 | A1 * | 11/2005 | Gorski et al. | 414/426 |
| 2007/0286714 | A1 * | 12/2007 | Frost | 414/592 |
| 2009/0035107 | A1 * | 2/2009 | Duran et al. | 414/426 |
| 2009/0155032 | A1 * | 6/2009 | Hedley et al. | 414/426 |
| 2009/0196721 | A1 * | 8/2009 | Thiel | 414/427 |

* cited by examiner

*Primary Examiner* — Joshua Rudawitz
(74) *Attorney, Agent, or Firm* — Crossley Patent Law; Mark A. Crossley

(57) ABSTRACT

The wheel and tire dolly apparatus provides a compact, mobile support for holding a wheel and tire at an adjustably chosen height within the cradle with backplate. The cradle can be pivoted with relation to the triangular base with omnidirectional casters. Two pivot arm casters optionally pivot outward to provide a wider base support. A spring loaded stop holds the wheel and tire within the cradle. The foot pedal controls raising and releasing of the upright within the vertical sleeve, the upright supporting the cradle.

1 Claim, 5 Drawing Sheets

WHEEL AND TIRE DOLLY APPARATUS

BACKGROUND OF THE INVENTION

A problem inherent in vehicle maintenance involves the vertical lift and lowering of wheel/tire combinations, either to remove or install a wheel and tire, or to service related and proximal vehicle parts. Lifting a wheel and tire is difficult, because of bulk and weight, with many wheel/tire combinations easily exceeding an individual's ability to lift them. Even if capable, a worker is prone to injury. While various devices have been proposed to alleviate the problems associated with handling wheels and tires, none offer all of the desirable advantages most needed in providing a tool for such which is compact, inexpensively produced and sold, easily operated, and quickly height adjustable. More than one device previously offered is quite complex. Complexity often results in a user simply not using the device, due either to a lack of competency or to the time involved in use. And, complex devices often negate purchase due to cost of production and sale. Some devices previously proposed are also quite bulky, thereby restricting use.

Too many wheels, too great a base dimension, and large overall size deter use in crowded work spaces, and offer sometimes even greater difficulty in storage when not in use. Some such devices require extended legs because the tire and device must have such to support the tire and/or wheel and negate toppling. These prior proposed devices also do not allow a tire or wheel to be pivotally positioned upon the device. Some devices require external pneumatic pressure for operation, a less than desirable trait in various work environments. Further, the devices previously proposed do not lend themselves to use in multiples. Rotating tires, for example, requires that either two or four tires, on a typical car, require removal, transfer to another hub, and reinstallation. Therefore, multiple devices are needed. A bulky, costly, or complex device does not encourage multiple purchases and use. Further, a bulky device does not always allow access to the vehicle's hubs, as jack stands, lifts, equipment, and a host of other items may simply bar proximity of a bulky device. What is needed is an apparatus for supporting a tire, wheel, or combination which is inexpensively produced and sold, so that multiple units may be employed. The apparatus should be operable without instruction. The ideal apparatus should be sufficiently compact to allow full access to an area proximal to the wheel and tire, so that full unencumbered use is possible. The ideal apparatus should provide for foot control in lifting and lowering, so that hands can be used for other tasks. The apparatus should also be compact to provide for storage in limited space areas. The apparatus should provide rotation of the supported wheel and tire.

The apparatus should be compactly sized to provide for confined space use, to provide for storage, and to provide for use in multiples, such as in rotating 4 or even more tires. The apparatus should further provide for holding a supported wheel and tire without the need for a user to aid in preventing the wheel and tire from falling. The present apparatus provides these advantages.

FIELD OF THE INVENTION

The wheel and tire dolly apparatus relates to vehicle maintenance tools and more especially to a tool for aiding in mounting and dismounting wheels and tires on vehicles.

SUMMARY OF THE INVENTION

The general purpose of the wheel and tire dolly apparatus, described subsequently in greater detail, is to provide a wheel and tire dolly apparatus which has many novel features that result in an improved wheel and tire dolly apparatus which is not anticipated, rendered obvious, suggested, or even implied by prior art, either alone or in combination thereof.

To attain this, the wheel and tire dolly apparatus provides a basic, uncomplicated, easy to use tire and wheel dolly. The inexpensive manufacture and sale allows the apparatus to be used in multiples, such as in tire rotation, an advantage not heretofore provided. The compactness of the apparatus provides for use in limited space quarters, and for storage in small areas. The pivotal capabilities of the upright within the sleeve allows the cradle to be positioned as needed, whether in storage or in use, in relation to the triangular base. For example, by pivoting the cradle in position over one of the corners of the triangular base, toppling of the apparatus is negated, without the bulk and multiple arms of other devices previously known. The pivotal ability of the tray provides the same advantage. The foot adjustment pedal allows hands to be occupied in other tasks, a great advantage in typical mechanical work. The spring-actuated stop of the cradle provides hands-free support of a tire and wheel. The apparatus is self-contained so that external hydraulic or pneumatic power is not required.

Thus has been broadly outlined the more important features of the improved wheel and tire dolly apparatus so that the detailed description thereof that follows may be better understood and in order that the present contribution to the art may be better appreciated.

An object of the wheel and tire dolly apparatus is to be inexpensively produced and sold so that the apparatus may be economically used in multiples.

Another object of the wheel and tire dolly apparatus is to be space efficient.

A further object of the wheel and tire dolly apparatus is to be capable of rotating the wheel and tire supporting cradle with respect to the base.

An added object of the wheel and tire dolly apparatus is to be foot operable for raising and lowering the cradle so that hands are free for other tasks.

And, an object of the wheel and tire dolly apparatus is to provide a place for tools.

Yet another object of the wheel and tire dolly apparatus is to provide adequate space efficient base support.

These together with additional objects, features and advantages of the improved wheel and tire dolly apparatus will be readily apparent to those of ordinary skill in the art upon reading the following detailed description of presently preferred, but nonetheless illustrative, embodiments of the improved wheel and tire dolly apparatus when taken in conjunction with the accompanying drawings.

In this respect, before explaining the current embodiments of the improved wheel and tire dolly apparatus in detail, it is to be understood that the wheel and tire dolly apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved wheel and tire dolly apparatus. It is therefore important that the claims be regarded as including such equivalent constructions insofar as they do not depart from the spirit and scope of the wheel and tire dolly apparatus. It is also to be understood that the phraseology and terminology employed herein are for purposes of description and should not be regarded as limiting.

DETAILED DESCRIPTION OF THE DRAWINGS

Figure 1:
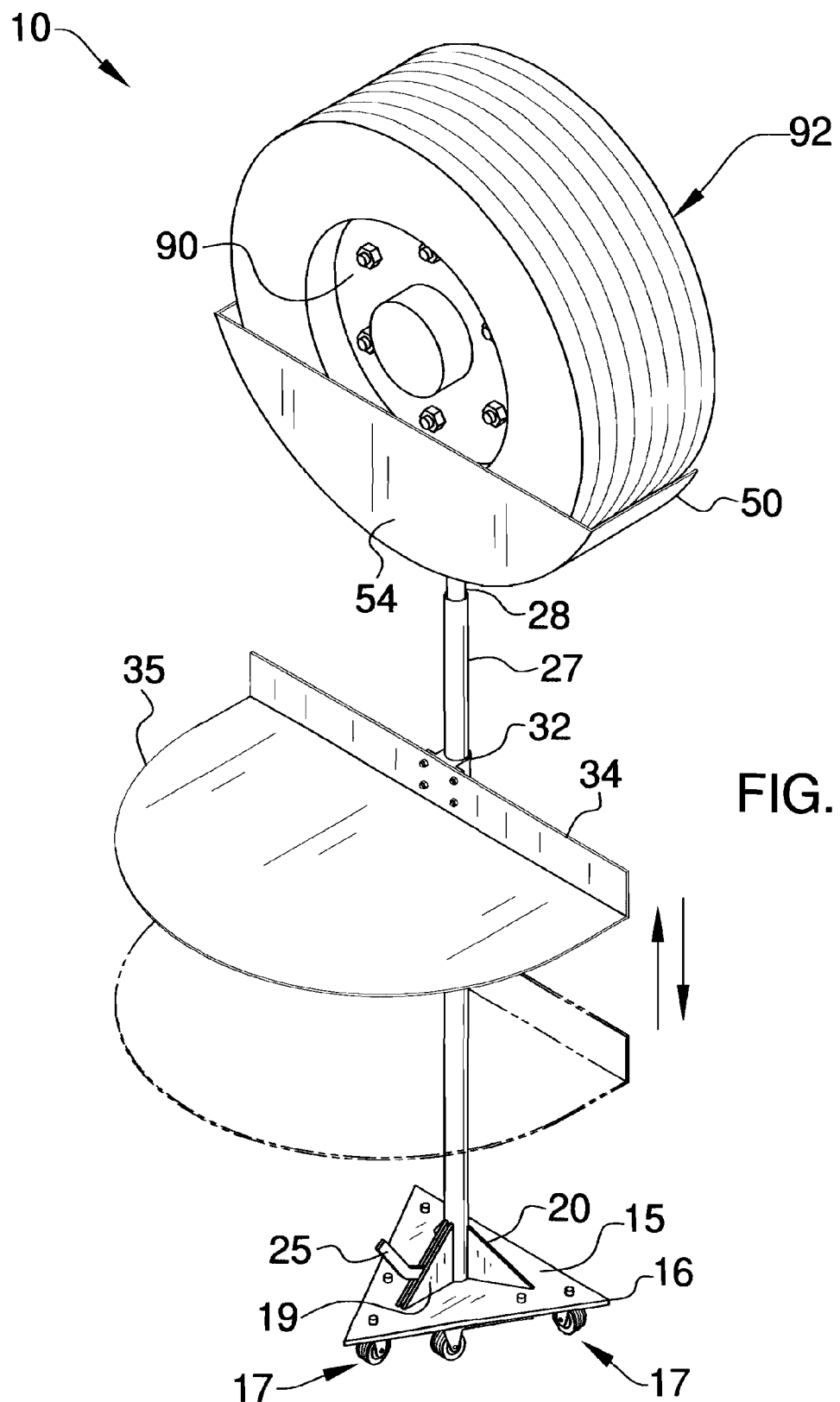
FIG. 1 is a perspective view of the apparatus in use.
Figure 2:
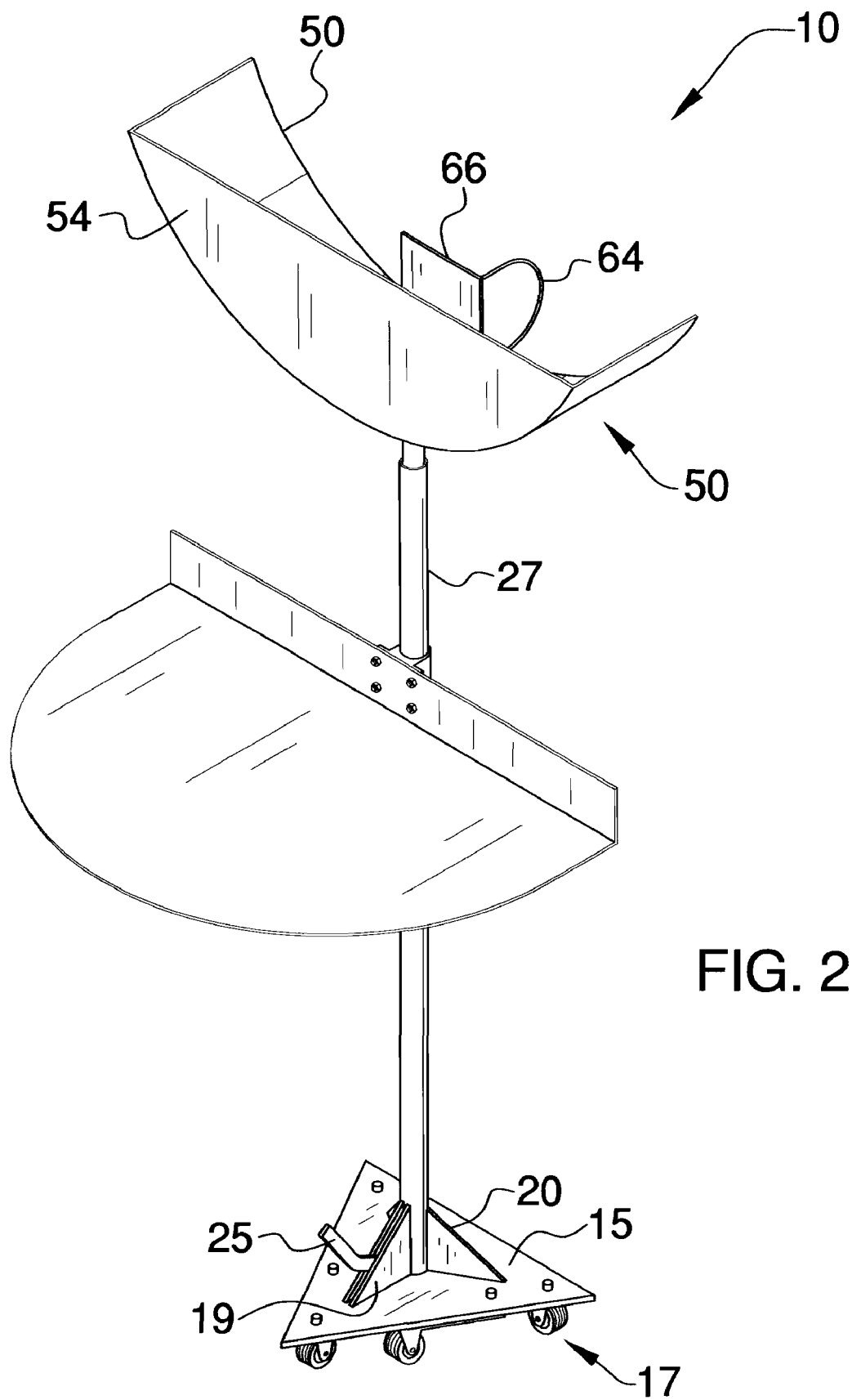
FIG. 2 is a perspective view.
Figure 3:
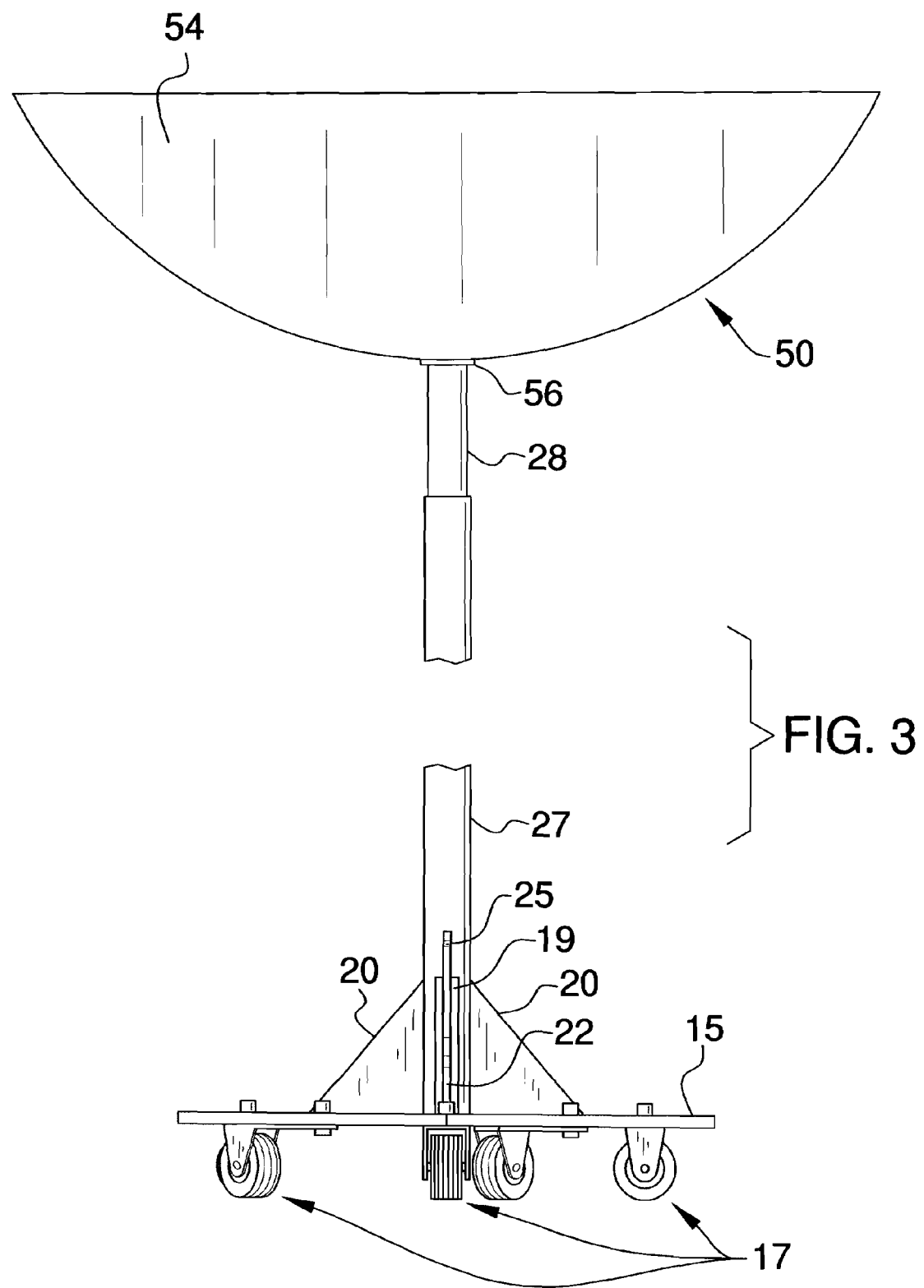
FIG. 3 is an elevation view of the apparatus with backplate of the cradle in the foreground.
Figure 4:
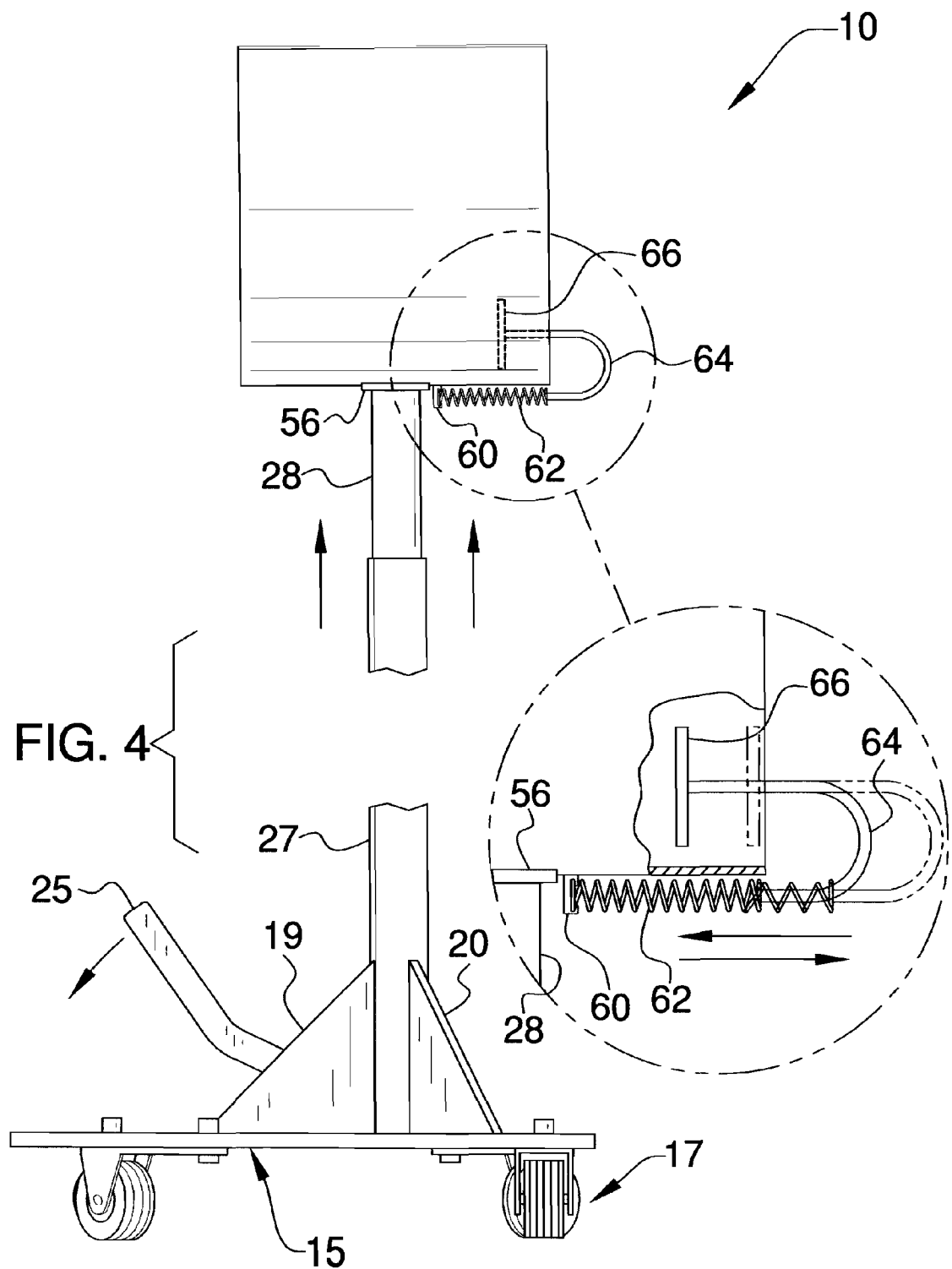
FIG. 4 is an elevation view, with detail of the spring loaded tire stop.
Figure 5:
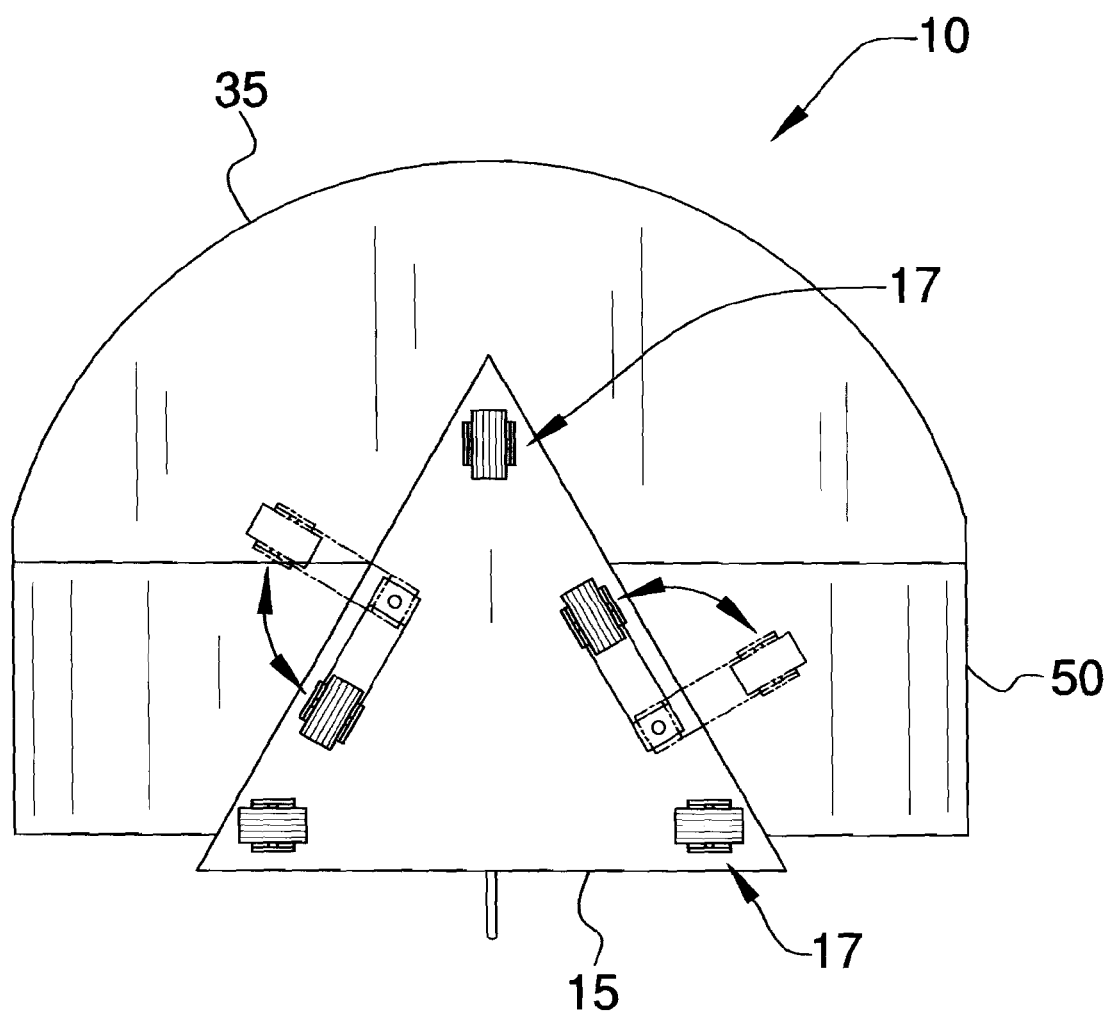
FIG. 5 is a bottom plan view.

With reference now to the drawings, and in particular FIGS. 1 through 5 thereof, the principles and concepts of the wheel and tire dolly apparatus generally designated by the reference number 10 will be described.

Referring to FIGS. 1-5, the wheel and tire dolly apparatus 10 provides for movably supporting a wheel 90 and tire 92 as needed in performing the various tasks associated with vehicle assembly and maintenance. The apparatus 10 comprises a triangular base 15 having fully pivotal swivel casters 17 such that omnidirectional movement is allowed. A caster 17 is disposed at the first corner 16 of the base 15. A caster 17 is disposed at the second corner 16b of the base 15. A caster 17 is disposed at the third corner 16c of the base. Additionally, the first pivot 18 with first pivot arm 18a is disposed on the base 15 between the first corner 16 and the second corner 16b. A swivel caster 17 is disposed on the first pivot arm 18a. Further, the second pivot 18b with second pivot arm 18c is disposed on the base 15 between the first corner 16 and the third corner 16c. A swivel caster 17 is disposed on the second pivot arm 18c. The first pivot arm 18a and the second pivot arm 18c are each selectively pivoted outward such that the added casters optionally provide a wider stance for the base 16. The sleeve 27 is extended vertically from the base 15. The spaced apart first triangulated gusset 19 and alternate triangulated gussets 20 support the sleeve 27, each providing added strength, respectively, in a space efficient design. Each of the first gusset 19 and alternate gussets 20 radiate toward one of the corners 16, respectively. The first gusset 19 further comprises a vertical groove 22 within which is slideably held the adjustment pedal 25. The pedal 25 is spring loaded such that pushing the pedal 25 downwardly progressively raises the upright 28 within the sleeve 27, thereby selectively raising the cradle 50. The upright 28 is free to pivot within the sleeve 27 so that the cradle 50 is positioned as desired, whether for convenience or for balance leverage. Elevation of the pedal 25 releases the upright 28 to slide downwardly within the sleeve 27. The semicircular tray 35 is perpendicularly attached to the back shield 34. The back shield 34 is affixed to the friction collar 32 which is slideably disposed on the sleeve 27. The leveraged weight of the tray 35 maintains the position of the friction collar 32 on the sleeve 27 as located by a user. The weight of tools and other items which may be placed on the tray 35 further leverages the friction collar 32 in selectively maintaining tray 35 positioning. The concave cradle 50 is affixed to the upright 28 via the strengthening collar 56.
The vertical backplate 54 is affixed to the cradle 50 in order to contain a tire 92 and wheel 90. The extension spring 62 is affixed below the cradle 50 to the anchor 60. The u-arm 64 is in direct communication with spring 62. The vertical stop 66 is disposed on the u-arm 64. The stop 66 automatically acts to secure a wheel 90 and tire 92 within the cradle 50 until a user removes the tire 92 and wheel 90. As the cradle 50 is affixed to the upright 28, the cradle 50 and hence tire 92 and wheel 90 can be pivoted within the sleeve 27 to locate the weight of the tire 92 and wheel 90 over the triangular base 15 as needed for support, work access, and convenience.

With respect to the above description then, it is to be realized that the optimum dimensional relationships for the parts of the wheel and tire dolly apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the wheel and tire dolly apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the wheel and tire dolly apparatus may be used.

Therefore, the foregoing is considered as illustrative only of the principles of the wheel and tire dolly apparatus. Further, since numerous modifications and changes will readily occur to those skilled in the art, it is not desired to limit the wheel and tire dolly apparatus to the exact construction and operation shown and described, and accordingly, all suitable modifications and equivalents may be resorted to, falling within the scope of the wheel and tire dolly apparatus.

What is claimed is:

1. A wheel and tire dolly apparatus, comprising:
   a triangular base having a first corner, a second corner, and a third corner, a pivotal caster disposed at each corner;
   a first pivot disposed between the first corner and the second corner;
   a selectively pivoted first pivot arm disposed on the first pivot;
   a swivel caster disposed on the first pivot arm;
   a second pivot disposed between the first corner and the third corner;
   a selectively pivoted second pivot arm disposed on the second pivot;
   a swivel caster disposed on the second pivot arm;
   a sleeve extended vertically from the base;
   a plurality of spaced apart gussets supporting the sleeve, comprising a first gusset and two alternate gussets, each gusset radiated toward one corner of the triangular base, respectively, the first gusset further comprising:
      a vertical groove;
      a spring acting on an adjustment pedal slideably disposed within the groove, a downward movement of the pedal progressively raises an upright slideably disposed with the sleeve, an upward movement of the pedal releases the upright;
   a semicircular tray perpendicularly attached to a back shield, the back shield affixed to a friction collar slideably disposed on the sleeve;
   a concave cradle affixed to the upright via a strengthening collar;
   a vertical backplate affixed to the cradle;
   an extension spring affixed below the cradle, a u-arm in communication with spring, a vertical stop on the u-arm, the wheel and tire selectively held upright within the cradle.

* * * * *